US010111565B2

(12) United States Patent
Poole et al.

(10) Patent No.: US 10,111,565 B2
(45) Date of Patent: Oct. 30, 2018

(54) BACKPACK BLOWER VAC COLLECTION BAG

(71) Applicant: BLACK & DECKER INC., New Britain, CT (US)

(72) Inventors: Brian E. Poole, Lutherville, MD (US); David K. Wheeler, Gananoque (CA); James T. Hess, Cockeysville, MD (US); Christine H. Potter, Phoenix, MD (US); David A. Miller, Aberdeen, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/712,345

(22) Filed: Sep. 22, 2017

(65) Prior Publication Data
US 2018/0084962 A1 Mar. 29, 2018

Related U.S. Application Data

(60) Provisional application No. 62/399,868, filed on Sep. 26, 2016.

(51) Int. Cl.
A47L 9/14 (2006.01)
A47L 5/14 (2006.01)
A47L 5/24 (2006.01)
A47L 9/24 (2006.01)
A45F 3/02 (2006.01)
(Continued)

(52) U.S. Cl.
CPC .............. A47L 9/149 (2013.01); A01G 20/43 (2018.02); A45F 3/02 (2013.01); A45F 3/04 (2013.01); A47L 5/14 (2013.01); A47L 5/24 (2013.01); A47L 9/242 (2013.01); A47L 9/2868 (2013.01); A45F 2003/003 (2013.01)

(58) Field of Classification Search
CPC ........ A47L 9/149; A47L 9/242; A47L 9/2868; A47L 5/24; A47L 5/14; A47L 9/14; A01G 20/43; A01G 1/125
USPC .................................. 15/347, 327.5, DIG. 8
See application file for complete search history.

(56) References Cited

U.S. PATENT DOCUMENTS 5,267,371 A 12/1993 Soler et al.
6,049,941 A 4/2000 Vollenweider, II
(Continued)

FOREIGN PATENT DOCUMENTS

CN 201595772 1/2010
CN 202761192 7/2012
(Continued)

OTHER PUBLICATIONS

EP Search Report dated Jan. 18, 2018, relating to EP Application No. 17192855.

*Primary Examiner* — David Redding
(74) *Attorney, Agent, or Firm* — John Yun

(57) ABSTRACT

The present invention is directed to a debris collection bag for a blowervac device, that is carried on a user's back. This improves the user's mobility and allows an increased capacity for the collection bag. The bag's location provides a comfortable weight distribution by separating the weight of the blowervac from the weight of the collection bag. The bag has a dust dispersion system to direct dust away from the user. The bag has a closure located on the side which makes emptying the bag easier. The bag closure is provided to make opening and closing the bag easier and faster, and resistant to dust and debris.

11 Claims, 10 Drawing Sheets

(51) Int. Cl.
*A45F 3/04* (2006.01)
*A47L 9/28* (2006.01)
*A01G 20/43* (2018.01)
*A45F 3/00* (2006.01)

(56) References Cited

U.S. PATENT DOCUMENTS

| | | |
|---|---|---|
| 7,721,384 B2 | 5/2010 | Crevling, Jr. et al. |
| 9,084,393 B1 | 7/2015 | Singleton |
| 2009/0250362 A1 | 10/2009 | Melmon |
| 2012/0058708 A1 | 3/2012 | Nenninger |
| 2012/0227209 A1 | 9/2012 | Vinson |
| 2014/0304940 A1 | 10/2014 | Brison |
| 2015/0020345 A1 | 1/2015 | Day |
| 2016/0095278 A1 | 4/2016 | Slater et al. |

FOREIGN PATENT DOCUMENTS

| | | |
|---|---|---|
| CN | 104139914 | 11/2014 |
| CN | 104272924 | 1/2015 |
| CN | 205369136 | 7/2016 |
| KR | 20140005444 | 1/2014 |
| KR | 101538011 | 7/2015 |

BACKPACK BLOWER VAC COLLECTION BAG

CROSS-REFERENCE TO RELATED APPLICATION

This application claims the benefit of U.S. Provisional Application No. 62/399,868 filed on Sep. 26, 2016, entitled Backpack Blowervac Collection Bag. The entire contents of U.S. Provisional Application No. 62/399,868 are incorporated herein by reference.

FIELD OF INVENTION

The present invention relates to blowervacs, specifically the debris collection bags used with portable blowervacs.

BACKGROUND OF INVENTION

Portable combination blower and vacuum devices (commonly referred to as blowervacs) are well known in the industry. These devices include a housing with a fan that operates in a first mode to blow air out of a tube to disperse debris. In a second mode, the fan direction is reversed to suck air and debris into the tube and deposit the debris into an attached debris collection bag. The collection bag is often attached to the device immediately adjacent the main housing and often gets in the way of the user as he tries maneuver the device.

Additionally, the weight of the collection bag is supported by the user's arms, and as the collection bag fills with debris, this becomes heavier and more uncomfortable for the user. Therefore, it would be advantageous to have a blowervac with an improved collection bag.

SUMMARY OF THE INVENTION

The collection bag of the present invention improves the user's mobility and allows an increased capacity for the collection bag. The collection bag is separated from the main housing of the device and positioned on a user's back. The bag is designed to improve the ergonomics of the bag and provide a comfortable weight distribution by separating the weight of the blowervac itself from the weight of the collection bag. The bag has a dust dispersion system to direct dust away from the user. A bag closure is provided to make opening and closing the bag easier and faster, and resistant to dust and debris (which can be problematic for existing closure such as zippers). The bag is designed to make emptying the bag easier, so that a user can empty the bag with one hand, while the bag is still on the user's back.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

It should be noted that throughout the specification, similar elements found in the various embodiments disclosed may be provided with the same reference number for simplicity, and is not intended to limit any embodiment.

Figure 1:
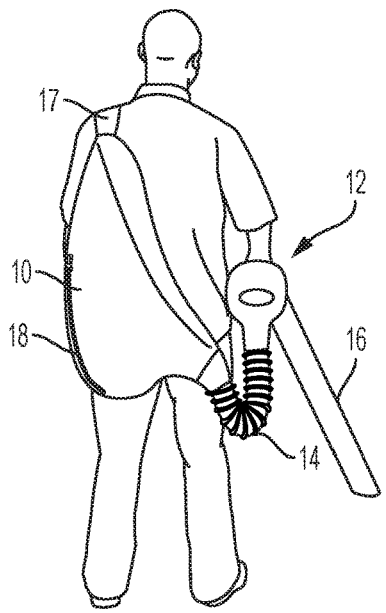
FIG. 1 is a view of a blowervac and collection bag in accordance with the teachings of a first embodiment of the present invention.

With reference to FIG. 1 of the drawings, a debris collection unit or collection bag 10 is shown. The collection bag 10 is connected to a blowervac 12 through a flexible transport hose 14. The blowervac 12 includes an air tube 16, that when operating in a blow mode blows air out of the air tube 16, and when operating in a vacuum mode, sucks air in through the air tube 16. Alternatively, some blowervacs use different air tubes for blowing and vacuuming, which must be switched out for the different modes. The blowervacs of both types are known in the art, and the present invention can be used with any device that vacuums. The collection bag 10 includes a single shoulder harness 17 that is placed over a user's should to secure the collection bag 10 to the user's back. A zipper 18 on a lower side of the collection bag 10 allows the user to empty the bag when full.

The collection bag 10 is used when operating the blowervac 12 in the vacuum mode. Debris 13, such as leaves (shown in FIG. 3A), is sucked in through the air tube 16 and is typically mulched by a fan inside the blowervac 12 itself. The mulched debris is then travels through the transport hose 14 and carried into the collection bag 10. The collection bag is at least partially made of air permeable material to allow air to escape (but not the mulched debris) and so that debris can continue to be blown into the collection bag 10. When the collection bag 10 is full, the debris can be emptied through the zipper 18.

Figure 2:
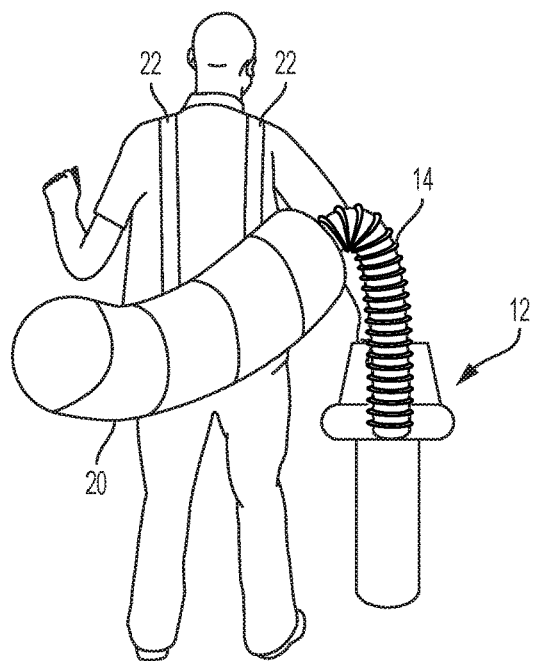
FIG. 2 is a view of a blowervac and collection bag in accordance with the teachings of a second embodiment of the present invention.

FIG. 2 shows a second embodiment of the invention showing a blowervac 12 and collection bag 20. Here the collection bag 20 uses two shoulder harnesses 22 to secure the collection bag 20 to the user.

Figure 3A:
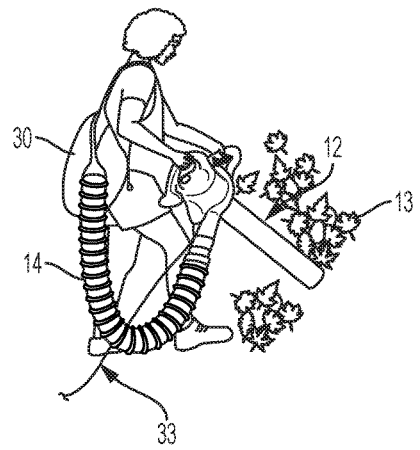
FIGS. 3A-3G show a blowervac and collection bag in accordance with the teachings of a third embodiment of the present invention.
Figure 3B:
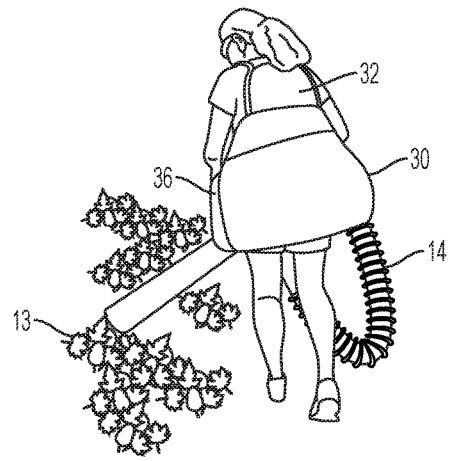
Figure 3C:
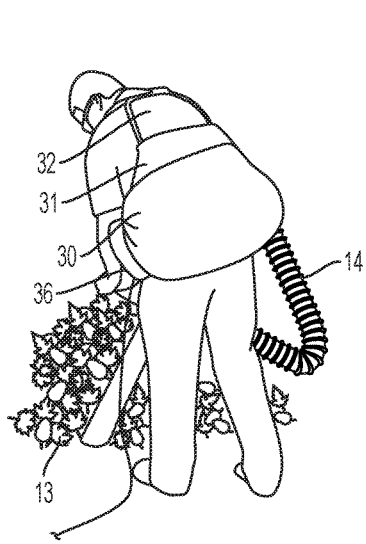
Figure 3D:
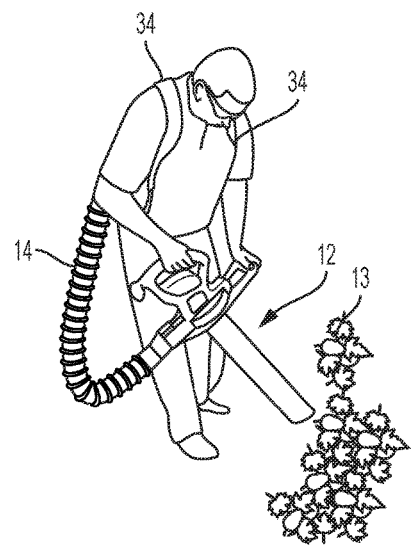

FIGS. 3A-3G show a third embodiment of the collection bag in various positions while in use. The collection bag 30 is connected to the blowervac 12 through a transport hose 14. Here the collection bag 30 is made of an air permeable material and is secured to a backplate 32. The backplate 32 is rigid enough to provide some support to the bag 30, but also compliant enough to conform to the user's back and be comfortable. The backplate 32 includes two shoulder harnesses 34 that wrap around a user's shoulder. The backplate 32 is not air permeable, and so shields the user from dirt and debris. Alternatively, the collection bag 30 can be made so that only a portion is air permeable. For example, the side adjacent the user's back can be made non-air permeable, while the remainder of the bag is air permeable so that air is blown away from the user. In another embodiment, the top and bottom portions of the bag can also be made non-air permeable. In FIG. 3C, a top portion 31 of the bag is made from a solid non-air permeable material.

FIG. 3A shows an electrical cord 33 that provides power to the blowervac 12. Although, an electrical cord is shown, it should be understood that the blowervac may be powered by batteries or any other power source and still fall within the scope of the invention.

Figure 3E:
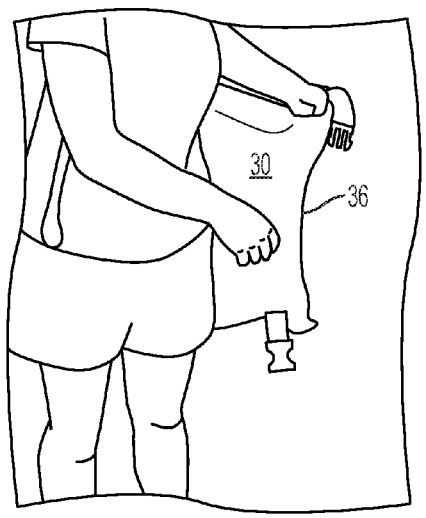
Figure 3F:
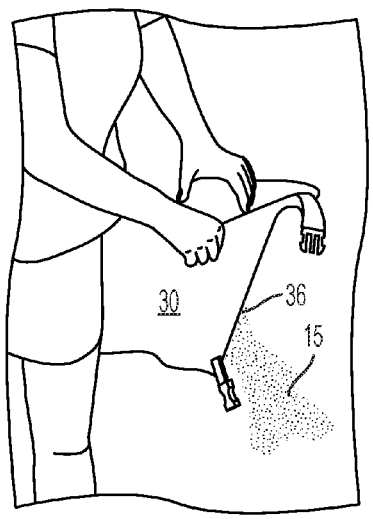
Figure 3G:
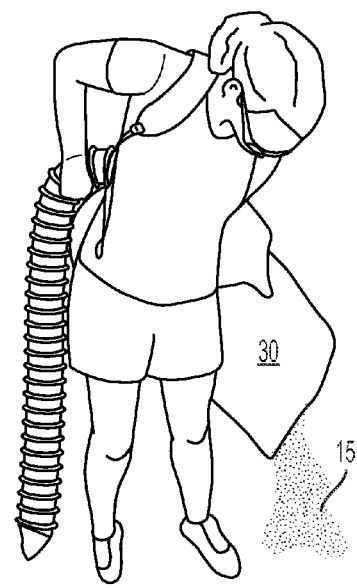

On one side of the bag is a closure 36 that opens and closes to empty the collection bag 30. The closure 36 is adjacent the left arm and can be easily accessed by the user's left arm to open the collection bag 30 while still on the user's back. FIGS. 3E-3G show the user opening the collection bag 30 and emptying its contents. The closure 36 will be described later, but can be access and opened by a single hand of the user. Once opened, the bag 30 is designed to allow its contents 15, for example mulched up leaves, to be easily emptied, and if needed the user can simply grab an opposing end of the bag to lift it up and empty its contents. This is best shown in FIG. 3G.

Figure 14:
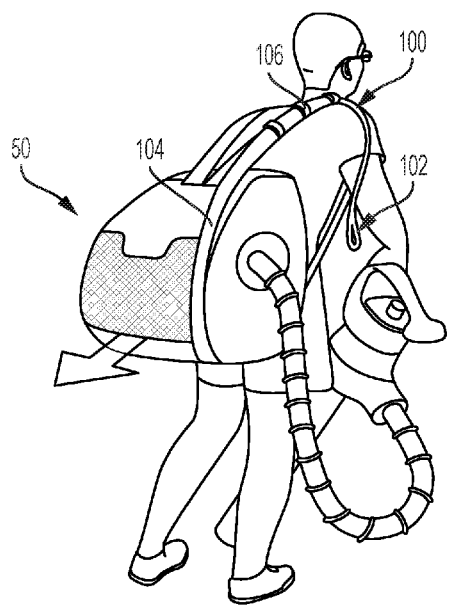
FIG. 14 shows a pull tab for the collection bag.
Figure 15:
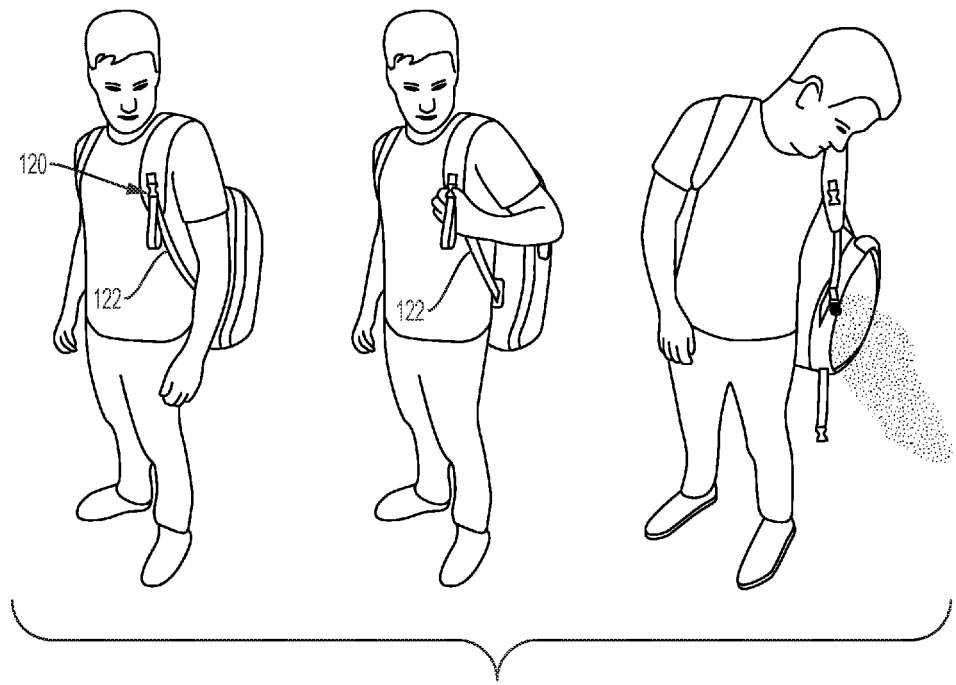
FIG. 15 shows a buckle for the collection bag.

Referring now to FIGS. 14 and 15, methods for making the collection bag easier to empty will be shown. The methods will be described in reference to collection bag 50, but can be incorporated into any collection bag within the scope of the present invention. In FIG. 14, a pull tab 100 is secured to a closed end of the bag 50, opposite a closure 56. The pull tab 100 includes a handle portion 102 that can be grasped by the user. The handle portion is attached to, or is part of a strap 104 that extends to the collection bag 50 and is secured thereto. Here the strap 104 is sewn onto a side portion of the collection bag 56. The strap 104 is secured to the shoulder harness 52 using elastic loops 106 to retain the strap 104 in place. When emptying the collection bag 50, a user can pull on the handle portion 102 of the pull tab 100, which will lift up the closed end of the collection bag 50, and consequently, tilts the open end (eg. closure end 56) downward to help empty its contents out. Referring to FIG. 3G, the user is lifting the end of the collection bag by reaching backwards with her right arm to help empty the bag. The pull tab 100 makes this process easier.

Referring to FIG. 15, a buckle 120 is shown on a shoulder harness of a collection bag. This buckle 120 is placed on the shoulder adjacent the opening of the bag. The buckle 120 when locked (as shown in the two left images) keeps a strap 122 in a shorten position. This is the position when the bowervac and collection bag are normally in use. When the user wishes to empty the collection bag, the user can unlock the buckle 120, allowing the additional length of the strap 122 to be utilized, and dropping the open end of the bag (shown in the rightmost image).

Figure 4:
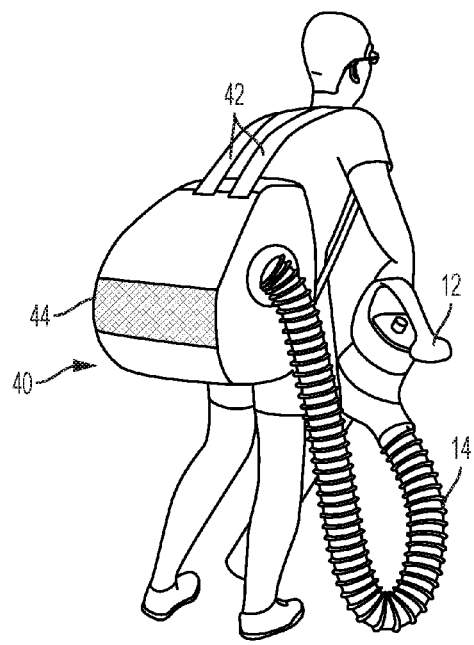
FIG. 4 shows a blowervac collection bag in accordance with the teachings of a fourth embodiment of the present invention.

FIG. 4 shows a fourth embodiment of a collection bag 40. It is again attached to a blowervac 12 through a transport hose 14. The collection bag 40 includes two harnesses 42 that secure it to a user. The user side of the collection bag 40 is made of a non-air permeable rigid or semi-rigid material to provide support to the bag and shield the user from debris. Otherwise, the bag is made of a non-air permeable material except for a small air permeable grill 44 that allows air to pass out of the collection bag 40. This directs the dust laden air that is being expelled away from the user.

Figure 5:
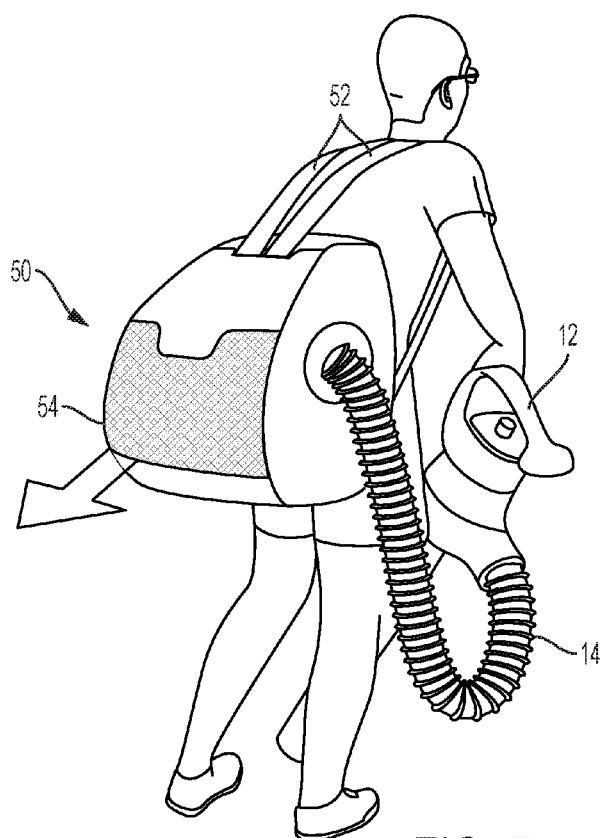
FIG. 5 shows a blowervac collection bag in accordance with the teachings of a fifth embodiment of the present invention.

FIG. 5 shows a fifth embodiment of a collection bag 50. The collection bag 50 is similar to the collection bag 40, except that the ends of the shoulder straps 52 are positioned closer together, and the air grill 54 is larger.

Figure 6:
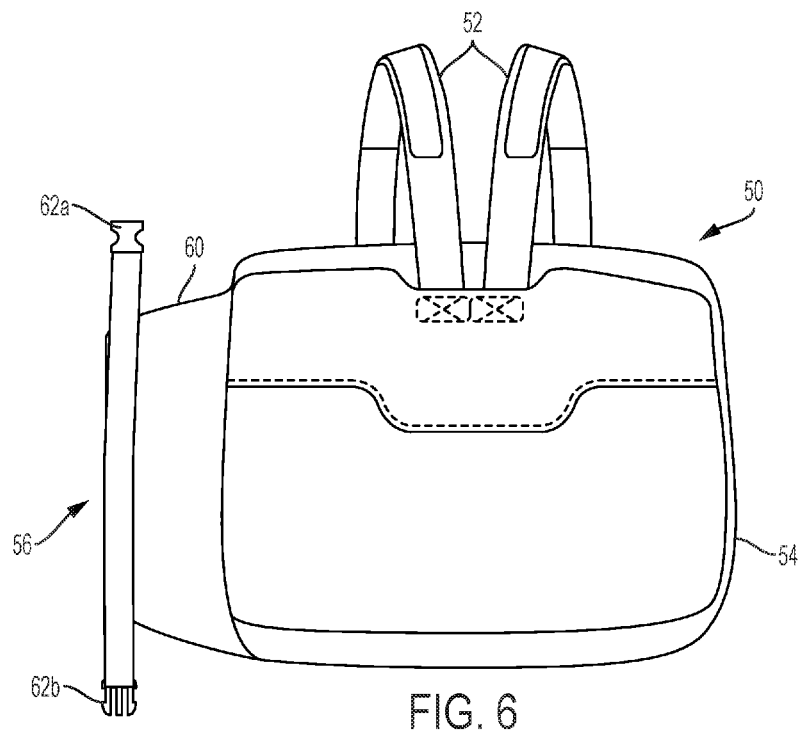
FIG. 6 shows the collection bag of FIG. 5 in an open position.
Figure 7:
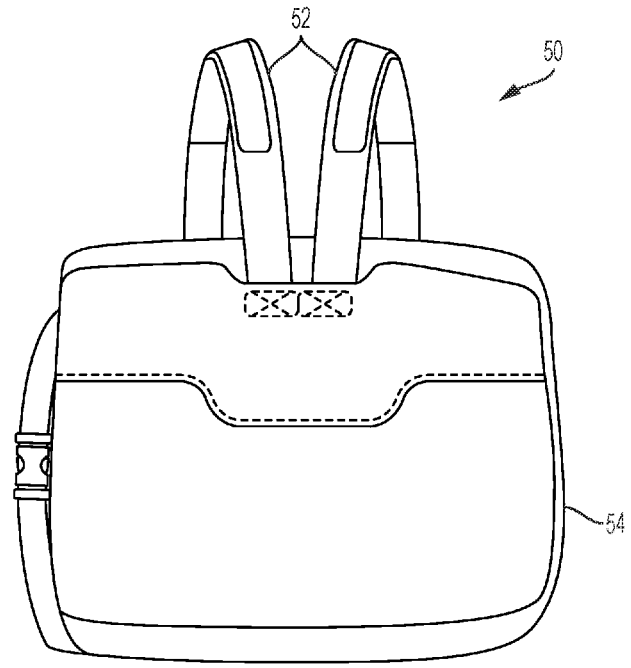
FIG. 7 shows the collection bag of FIG. 5 in a closed position.
Figure 8:
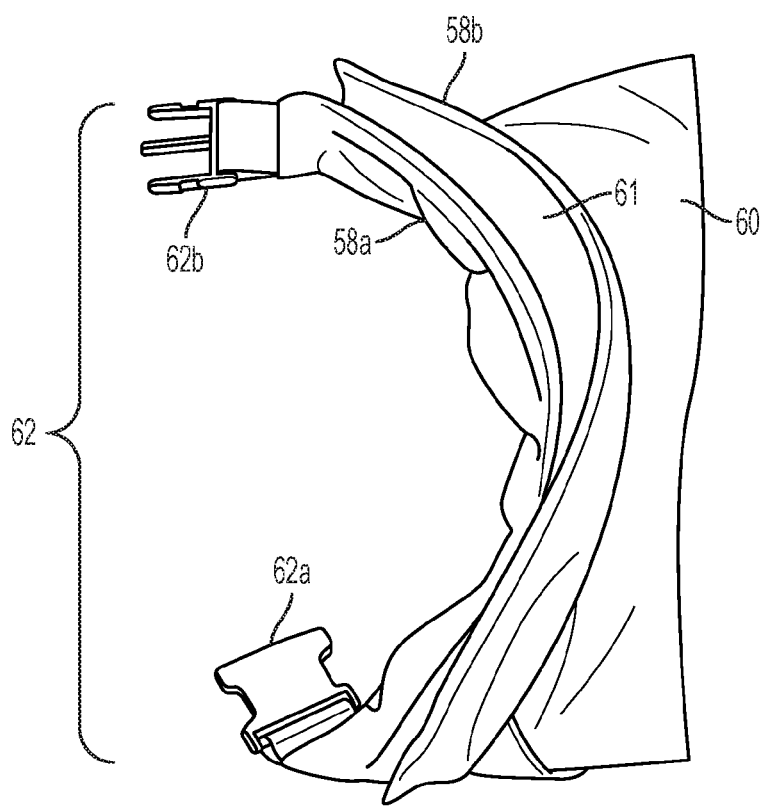
FIG. 8 shows the closure for the collection bag of FIG. 5.

FIGS. 6-10 show the closure 56 for the collection bag 50. It is noted that this closure 56 can be used with any collection bag though. The closure 56 includes a pair of rigid latching bars 58a and 58b (shown in FIG. 8) located along the end of a flexible sleeve 60. The latching bars preferably made from a hardened plastic material, but can be any material that provides rigidity to the opening and are also flexible enough to be closed as will be described later. Referring to FIG. 8, the latching bars 58a and 58b form an opening 61 on the sleeve 60 allowing for opening and closing of the collection bag 50. One of the latching bar 58a includes a buckle 62 with corresponding parts 62a and 62 on the ends that are adapted to lock with each other. FIG. 6 shows the closure 56 with the sleeve 60 in an unfurled position, and the buckle 62 unlocked. In this way, the latching bars 58a and 58b can be separated to create the opening 61, and any debris inside can be emptied out.

Figure 9:
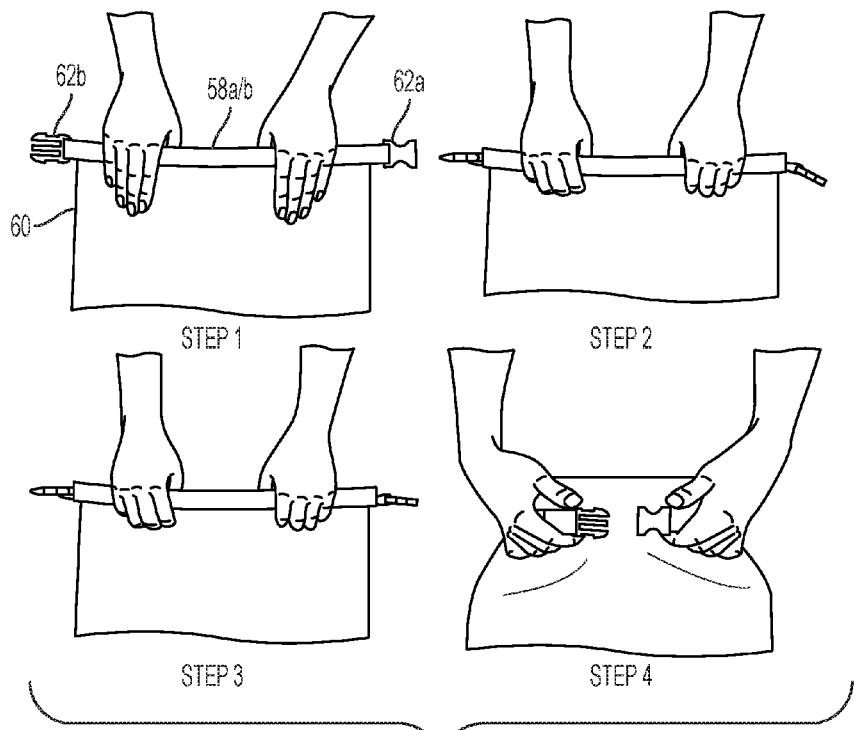
FIG. 9 shows the operation of the closure for the collection bag of FIG. 5.
Figure 10:
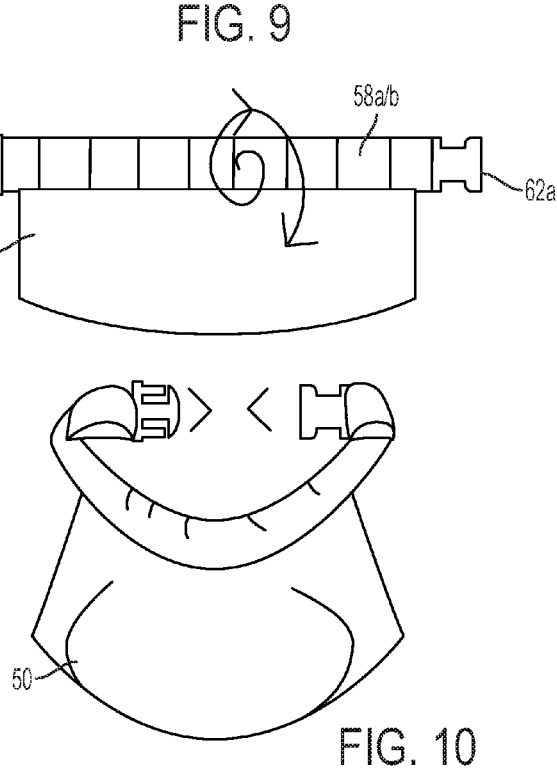
FIG. 10 is another image of the operation of the closure for the collection bag of FIG. 5.

Referring to FIG. 9, the closing of the closure 56 is shown. First, the latching bars 58a and 58b are placed together and aligned with each other, as shown in step 1. Then the bars 58a and 58b are rolled up the sleeve 60 until it's adjacent the collection bag 50 and can't be rolled any further, as shown in steps 2 and 3. The bars 58a and 58b are then folded so that the ends of the buckle 62a and 62b are brought together and locked, as shown in step 4. This prevents the sleeve 60 from unfurling and keeps the closure 56 closed while the blowervac is in use. FIG. 10 shows another example of the same process.

Figure 11:
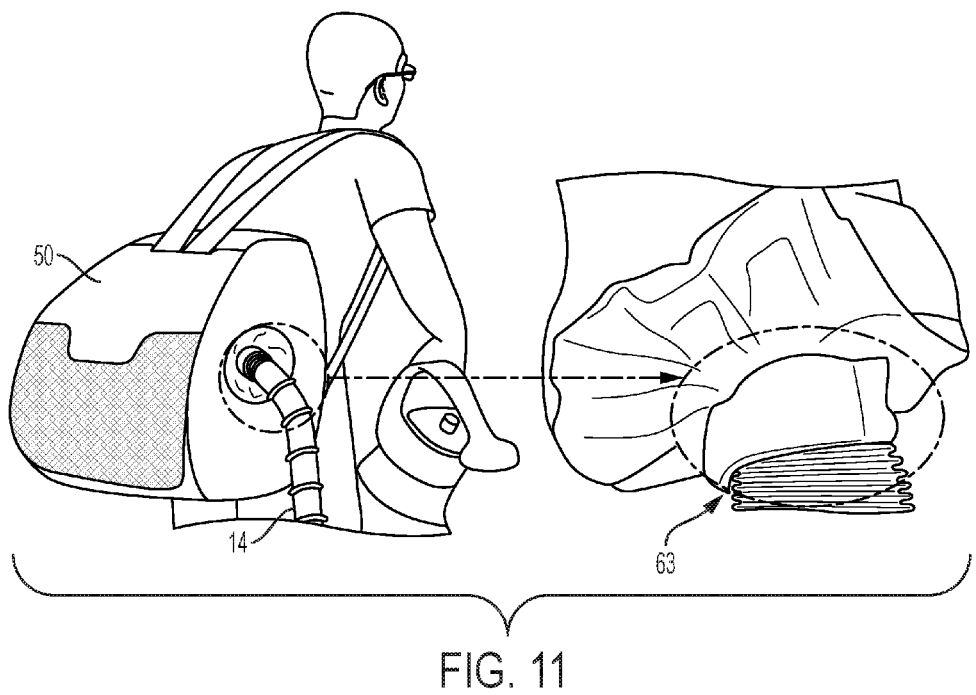
FIG. 11 shows the connection of the vacuum hose with the collection bag of FIG. 5.

FIG. 11 shows the attachment of the transport hose 14 to the collection bag 50 using a connector 63. The connector is made of a pliant stitch bonded fabric with acrylic foam coating, a woven fabric, or other similar material. This provides more easier maneuverability of the hose 14.

Figure 12:
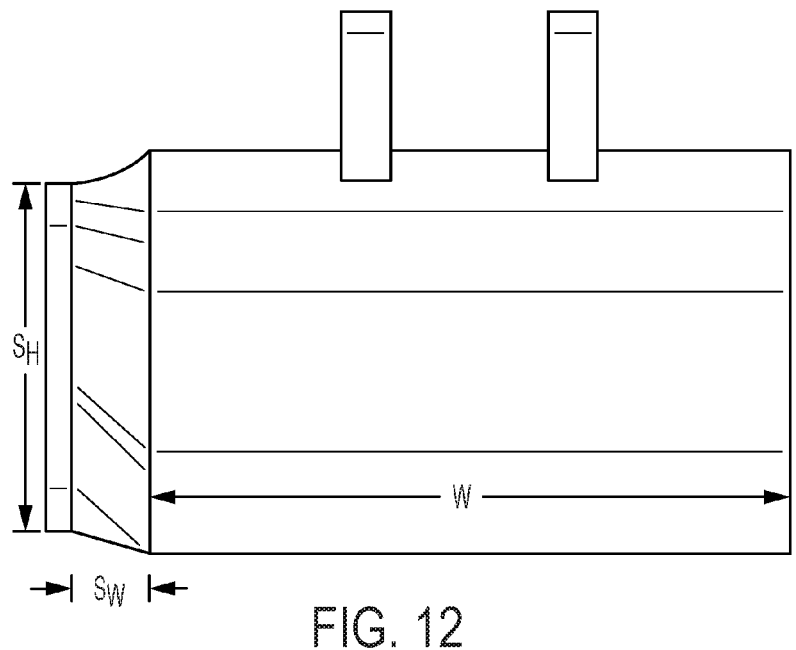
FIGS. 12 and 13 show an example of the dimensions of another embodiment of a collection bag.
Figure 13:
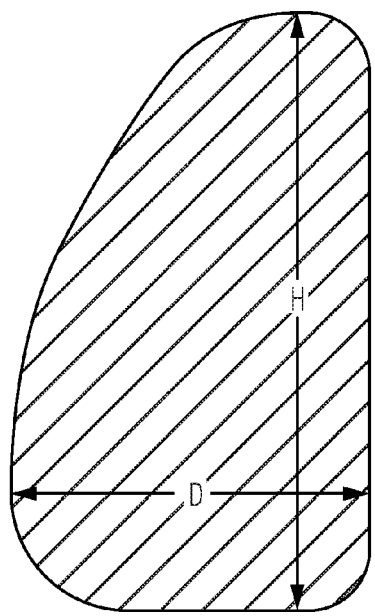

FIGS. 12 and 13 show the dimensions of a collection bag of an embodiment of the present invention. The width of the bag W is approximately 800 millimeters, a height H is approximately 500 millimeters and a depth D is approximately 301 millimeters. Additionally, the sleeve has a width $S_W$ of approximately 130 millimeters and height $S_H$ of approximately 430 millimeters. Of course it should be understood that the collection bag can have any dimensions and be of any shape and still fall within the scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A collection bag for a blowervac comprising:
   a collection bag adapted to be attached to a blowervac through a hose;
   at least one shoulder strap secured to the collection bag to allow the collection bag to be carried on a user's back;

wherein the collection bag has a user side adjacent the user's back, a front side opposite the user's side and side portions connecting the user's side to the front side, the collection bag being made of non-air permeable material except for a grill portion on a lower portion of the front side being made of an air permeable material.

2. The collection bag of claim 1 wherein one of the side portions of the collection bag has an opening for allowing access to the contents of the collection bag.

3. The collection bag of claim 2, further comprising a sleeve that is rolled up to close the opening to the collection bag.

4. The collection bag of claim 3, wherein the sleeve includes a pair of latching bars at the end of the sleeve.

5. The collection bag of claim 1 further comprising a pull tab attached to the shoulder strap or collection bag on a closed side of the collection bag, to lift the closed side of the collection bag to help empty its contents.

6. A collection bag for a blowervac comprising:
a collection bag adapted to be attached to a blowervac through a hose;
a pair of shoulder strap secured to the collection bag to allow the collection bag to be carried on a user's back;
wherein the collection bag has a first surface adjacent the user's back, a second surface opposite the first surface, and two opposite side surfaces connecting the first surface and the second surface;
wherein the first surface is made of non-air permeable material, and a portion of the second surface includes a grill made of air permeable material; and
one of the side surfaces includes an opening to allow the contents of the collection bag to be emptied and the other of the side surfaces is adapted to connect to the hose.

7. The collection bag of claim 6, wherein the opening has a closure that blocks the access to the opening, the closure including a sleeve that is rolled up to close the opening.

8. The collection bag of claim 7, wherein the closure includes a pair of latching bars at the ends of the sleeve that are rolled up in the sleeve to close the opening.

9. The collection bag of claim 8, further comprising a buckle on the closure to prevent the sleeve from unrolling.

10. The collection bag of claim 6 further comprising a pull tab on the shoulder strap or collection bag on the side of the collection bag connected to the hose to allow a user to lift the closed side of the collection bag to help empty its contents.

11. The collection bag of claim 6 further comprising a buckle on one of the shoulder straps, the buckle shortening the length of the should strap when engaged and lengthening the shoulder strap when disengaged.

* * * * *